United States Patent
Harvey

[19]

[11] Patent Number: 6,044,401
[45] Date of Patent: Mar. 28, 2000

[54] NETWORK SNIFFER FOR MONITORING AND REPORTING NETWORK INFORMATION THAT IS NOT PRIVILEGED BEYOND A USER'S PRIVILEGE LEVEL

[75] Inventor: John Paul Harvey, Round Rock, Tex.

[73] Assignee: International Business Machines Corporation, Armonk, N.Y.

[21] Appl. No.: 08/753,085

[22] Filed: Nov. 20, 1996

[51] Int. Cl.[7] .................................................. G06F 15/16
[52] U.S. Cl. ........................................... 709/225; 713/201
[58] Field of Search ............................ 395/186, 187.01, 395/188.01, 200.53, 200.54, 200.55, 200.56; 709/223–226; 713/200–202

[56] References Cited

U.S. PATENT DOCUMENTS

| | | | |
|---|---|---|---|
| 4,739,510 | 4/1988 | Jeffers et al. | 380/15 |
| 5,245,429 | 9/1993 | Virginio et al. | 358/142 |
| 5,333,308 | 7/1994 | Ananthanpillai | 395/182.02 |
| 5,359,367 | 10/1994 | Stockill | 348/552 |
| 5,425,101 | 6/1995 | Woo et al. | 380/23 |
| 5,426,421 | 6/1995 | Gray | 395/200.53 |
| 5,519,780 | 5/1996 | Woo et al. | 380/49 |
| 5,610,905 | 3/1997 | Murthy et al. | 370/401 |
| 5,648,965 | 7/1997 | Thadani et al. | 370/241 |
| 5,798,706 | 8/1998 | Kraemer et al. | 340/825.07 |
| 5,828,846 | 10/1998 | Kirby et al. | 709/238 |
| 5,933,602 | 8/1999 | Grover | 709/224 |
| 5,950,195 | 9/1999 | Stockwell et al. | 707/4 |
| 5,956,715 | 9/1999 | Glasser et al. | 707/9 |

OTHER PUBLICATIONS

Jacobson et al., "tcpdump", manual included with tcpdump program, pp. 1–26, Jun. 20, 1994.
"A Very Brief Guide to tcpdump", Internet, pp. 1–2, Sep. 19, 1996.

*Primary Examiner*—Zarni Maung
*Assistant Examiner*—Andrew Caldwell
*Attorney, Agent, or Firm*—Sawyer & Associates; Volel Emile

[57] ABSTRACT

The present invention provides a method and system for locating available information in a network environment by a user in a node. In a system aspect, within a node in the network, the present invention includes a network sniffer and an access sniffer. The access sniffer includes an access element and an access interface. The access element preferably includes a memory and a database. The access element accesses the network sniffer and filters out unavailable information by using information such as address and port numbers gathered by the network sniffer. Unavailable information includes information which is non-public or beyond the privilege level of the particular user. The access element evaluates data streams which are public information to determine if the data streams meet a predetermined criteria. If the data streams meet the predetermined criteria, then the data is saved in the database. The access element transfers only the information available to the particular user to the access interface. The access element can time itself for a limited amount of time for execution. Once the predetermined time period has expired, the access element is complete and it can save and transfer the appropriate information to the access interface.

19 Claims, 3 Drawing Sheets

NETWORK SNIFFER FOR MONITORING AND REPORTING NETWORK INFORMATION THAT IS NOT PRIVILEGED BEYOND A USER'S PRIVILEGE LEVEL

TECHNICAL FIELD

The present invention is related to locating information in a network environment, particularly available information in a network environment being located by a node in the network through the use of a network sniffer along with an access sniffer.

BACKGROUND

A network environment typically includes multiple nodes in which a node itself can also be a network. Information can be transmitted from one of these nodes which can be received by another node in the network.

Multimedia data streams can be sent through public networks for reception by the general public. The data streams can consist of audio, video, whiteboard, or any other type of digital data. A user on the network can receive these data streams using the appropriate software and with knowledge of the multicast address and port number for the stream. The problem is that it is difficult to locate the desired information since the user must typically know the address and port number for a desired data stream.

A network sniffer is a system and method that is normally used to monitor network activity when resolving network problems or when improving network efficiency. Although the network sniffer can typically access information regarding all data being transferred into the node, access to the network sniffer is generally privileged due to the sensitivity of some of the data on the networks. Thus, there is a need to facilitate ease of access to available information in a network environment. The present invention addresses such a need.

SUMMARY

The present invention is a system and method for locating requested data streams by accessing data monitored by a network sniffer for a particular node and evaluating data which is within the privilege level of a particular user.

A network sniffer is a system and method that is normally used to monitor network activity when resolving network problems or when improving network efficiency. Because of the sensitivity of some of the data on networks, average users are not generally allowed to access network sniffers.

A method according to the present invention for locating available information in a network environment by a node in the network comprising the steps of accessing a network sniffer which can monitor data sent to a node; determining if the data being monitored by the sniffer is privileged; and accessing data which is not privileged beyond the user's level.

The present invention can locate an address and port number of a data packet through the use of the network sniffer, determine if it has already been processed, evaluate the data packet associated with the address and port number, and determine if it meets predetermined criteria. If it does meet the predetermined criteria, then the data is saved in a database.

DETAILED DESCRIPTION

The illustrative embodiment is related to a system and method for locating available information in a network. The following description is presented to enable on of ordinary skill in the art to make and use the illustrative embodiment and is provided in the context of a patent application and its requirements. Various modifications to the illustrative embodiment will be readily apparent to those skilled in the art and the generic principles herein may be applied to other embodiments. Thus, the illustrative embodiment is not intended to be limited to the embodiment shown but is to be accorded the widest scope consistent with the principles and features described herein.

Figure 1:
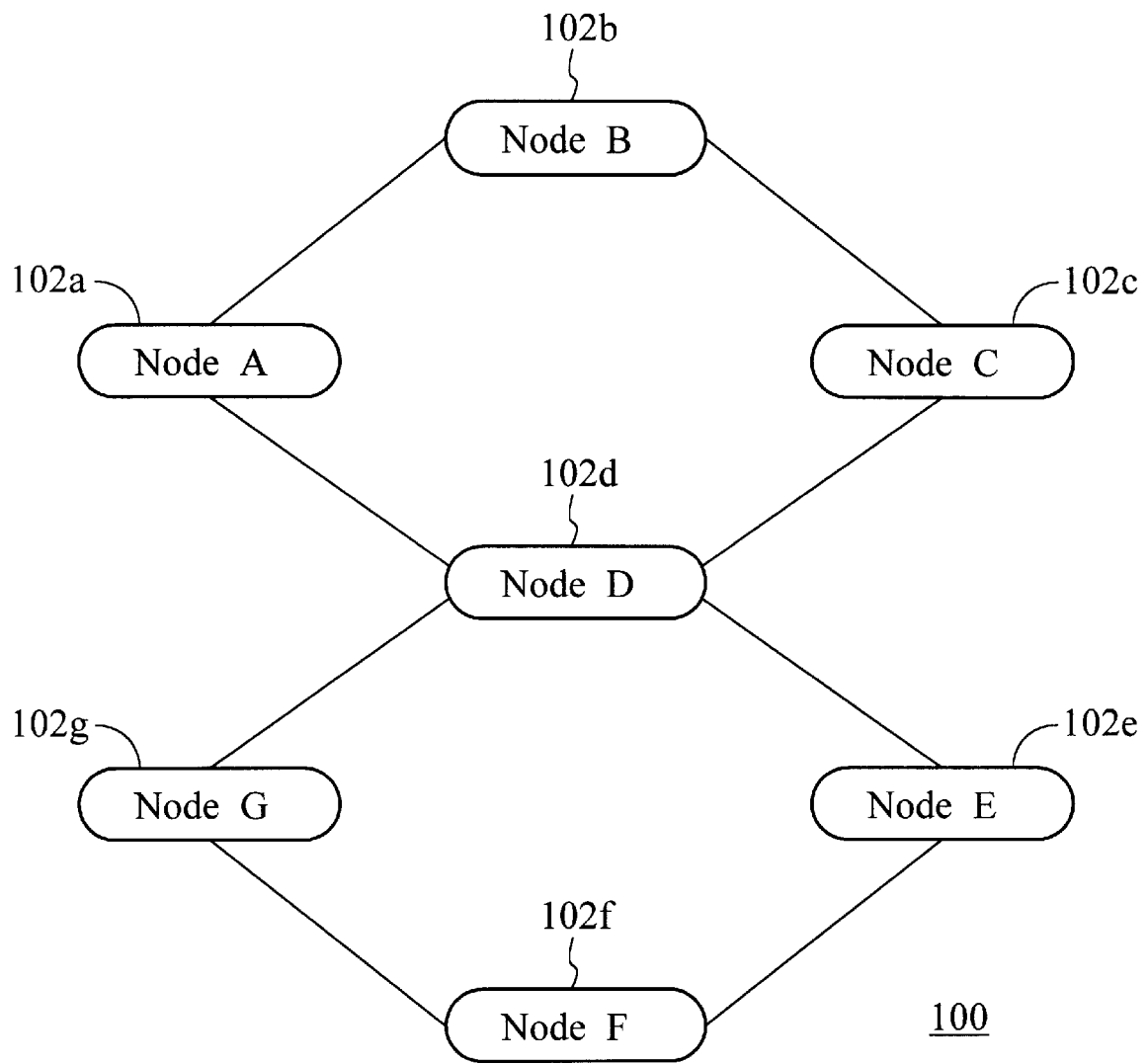
FIG. 1 is a diagram representing a network.

FIG. 1 is a diagram depicting a network environment 100. The network 100 includes multiple nodes 102a–102d, in which a node itself can also be a network, as shown by 102d–102g. Information, such as video and audio, can be transmitted from one of the nodes such as the node 102a. This information can be received by another node in the network such as node 102f by using appropriate software and the knowledge of the multicast address and port number for the data stream.

The present invention uses services available through a network sniffer to examine the network connections and list the addresses and port numbers of available data streams such as multicast streams.

The present invention allows non-privileged users to access a network sniffer for gathering public information. It can also allow users to access a network sniffer for gathering information which is available up to the particular privilege level of the user. Public information and information which is available up to the particular privilege level of the user is herein collectively referred to as "available information." Non-public and sensitive information beyond the privilege level of the user is not reported. The available information may be further filtered so that only data meeting predetermined criteria, such as data for particular applications, are reported.

There are many ways in which a piece of information may be deemed privileged. Privileged information can include, but is not limited to, the following:

(1) a packet of information form the network having a destination address that is different from the address of the node the user is using;

(2) a packet of information having a source or destination port number that is reserved for privileged processes;

(3) a packet of information having a source or destination port number that is well known for passing privileged information;

(4) a packet of information which information is scrambled or encrypted;

(5) a packet of information which is not scrambled or encrypted, but contains a recognized structure that indicates that the data is privileged;

(6) a packet of information which is not scrambled or encrypted, but contains a recognized structure that indicates that the destination is some other user.

There are also many ways in which a piece of information may be deemed not privileged or not beyond the particular user's privilege level. Information which is not privileged can include, but is not limited to, the following:

(1) a packet of information which is not encrypted and contains a recognized structure that indicates that the data is not privileged;

(2) a packet of information having a source or destination port number that is well known for passing non-privileged information.

In addition to including the information which is not privileged, information which is not beyond the particular user's privilege level can also include, but is not limited to, the following:

(1) a packet of information which is scrambled or encrypted and can be unscrambled or decrypted with information (a key) provided by the user.

(2) a packet of information which is not scrambled or encrypted, but contains a recognized structure that indicates that the destination is the particular user.

Although the examples described herein are for multicast data, the method and system of the present invention also applies to broadcast, unicast, and other data that can be identified as available to the user.

Figure 2:
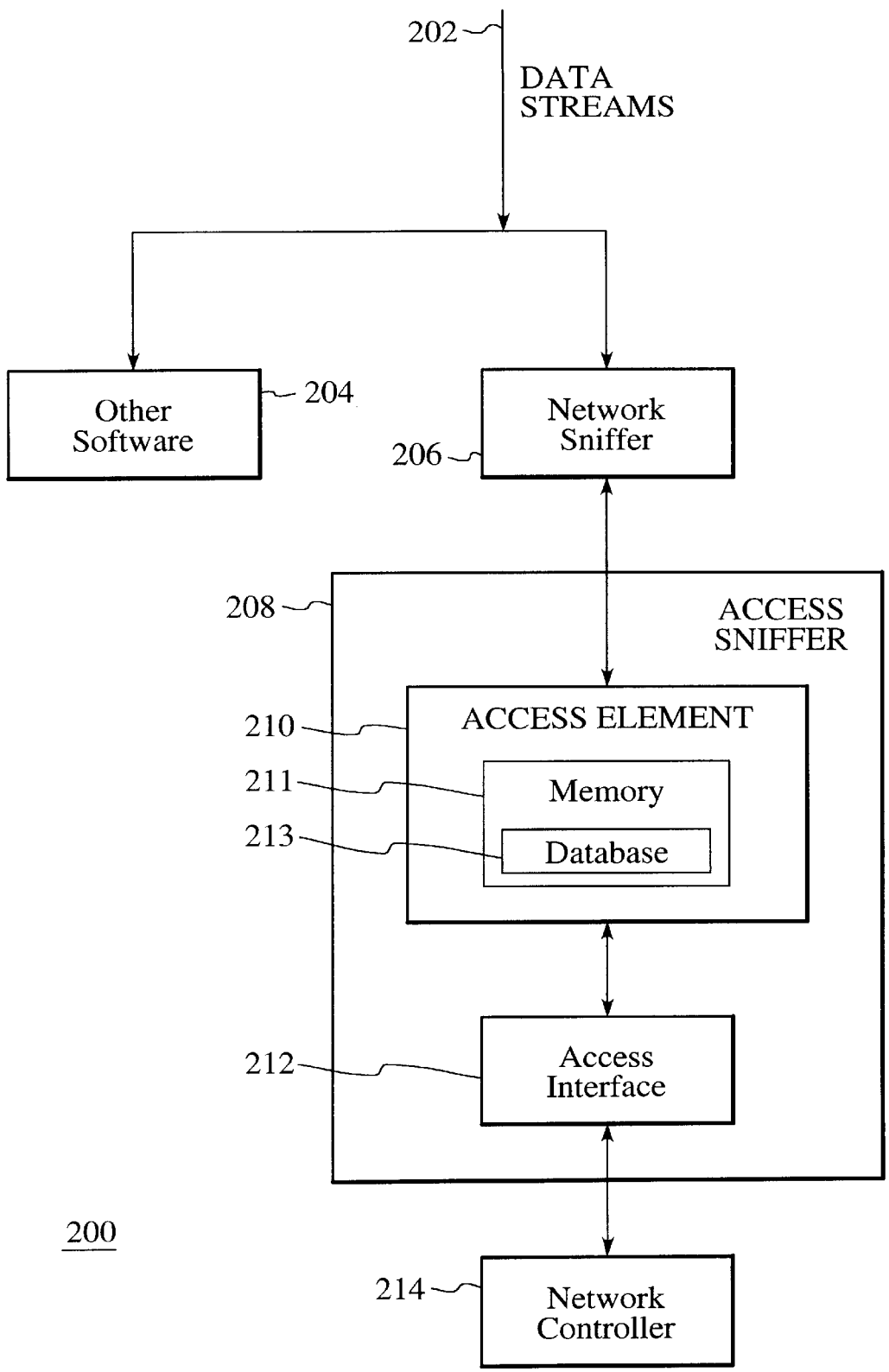
FIG. 2 is a functional block diagram of a system according to the present invention.

FIG. 2 is a functional block diagram of a system according to the present invention. The basic components of system 200, which is preferably located within a node in a network, include a network sniffer 206, an access sniffer 208, and a network controller 214. The access sniffer 208 includes access element 210 and access interface 212. The access element 210 preferably includes a memory 211 and a database 213.

Data streams 202 enter the node and are utilized by software 204 in the system 200. Copies of the data streams 202, or portions thereof, can be accessed by the network sniffer 206. The access sniffer 208 can then access the data streams being evaluated by the network sniffer 206. The access element 210 accesses the network sniffer 206 and filters out unavailable information by using information such as address and port numbers gathered by the network sniffer 206. Unavailable information includes information which is non-public or beyond the privilege level of the particular user.

The access element 210 can evaluate data streams which are public information to determine if the data streams meet a predetermined criteria, such as multicast real time protocol (RTP), for video and audio. Examples of addresses which the access elements 210 can utilize include multicast and unicast addresses.

Access element 210 preferably removes all unacceptable data streams. It preferably executes virtually all the major functions of the access sniffer 208. The access element 210 can exclude data streams which are not targeted for this particular node, and exclude addresses destined for other software on the node. It can also execute unicast addresses if one of the predetermined criteria is to look for a multicast addresses. It can run tests on the data streams to determine if the data streams are valid. If it is not valid, then the access element 210 can exclude it. If it is valid, then it can determine whether the address and port number associated with that valid data stream are information available to the particular user. Access element 210 can also monitor the port number for data streams which meet the predetermined criteria.

The access element 210 can also check to see if a particular address and port number have been evaluated in the past. If so, then it ignores the previously evaluated address and port number. If the address and port number have not been previously evaluated, and they also meet the predetermined criteria, then these data streams are kept in the data base 213. Examples of predetermined criteria include a particular privilege level such as public information, a type of information such as a particular node name, type name, or user name of the particular source.

Once access element 210 finds data streams which meet the predetermined criteria, it can then save that information along with the port number and the address associated with it. When the access element 210 has completed its functions, it preferably saves the filtered data and transfers only the information available to the particular user to the access interface 212. It is preferable that the access element 210 does not transfer encrypted information or password information to the access interface 212.

The access element 210 can time itself for a limited amount of time for execution. Once the predetermined time period has expired, the access element 210 is complete, and it can save and transfer the appropriate information to the access interface 212.

One example of how the access element 210 maintains information in the database 213 is to open what is referred to in UNIX as a socket. The access element 210 can obtain a body of a data packet from the socket by looking for a specific port number and address. If the data stream located in the data base 213 is a particular type of data stream, such as a type name, a particular node name, or user name of the particular source, then that type can also be added to the data base 213.

At the end of the predetermined time, the access element 210 preferably stops the process, closes all the sockets it opened, evaluates the database 213, converts the requested information to a string, and passes it to the access interface 212.

The information in the network sniffer 206 and the access element 210 are preferably privileged information, thus the user preferably does not have direct access to the access element 210, but rather utilizes the access interface 212 to access only the information which is either public or within that particular user's privilege level. The information within the access interface 212 can then be transferred to the network controller 214. Although the access interface is shown in FIG. 2 to be included in the access sniffer 208, the access interface 212 can be a separate component and the access element 210 can then function as the access sniffer 208.

Figure 3:
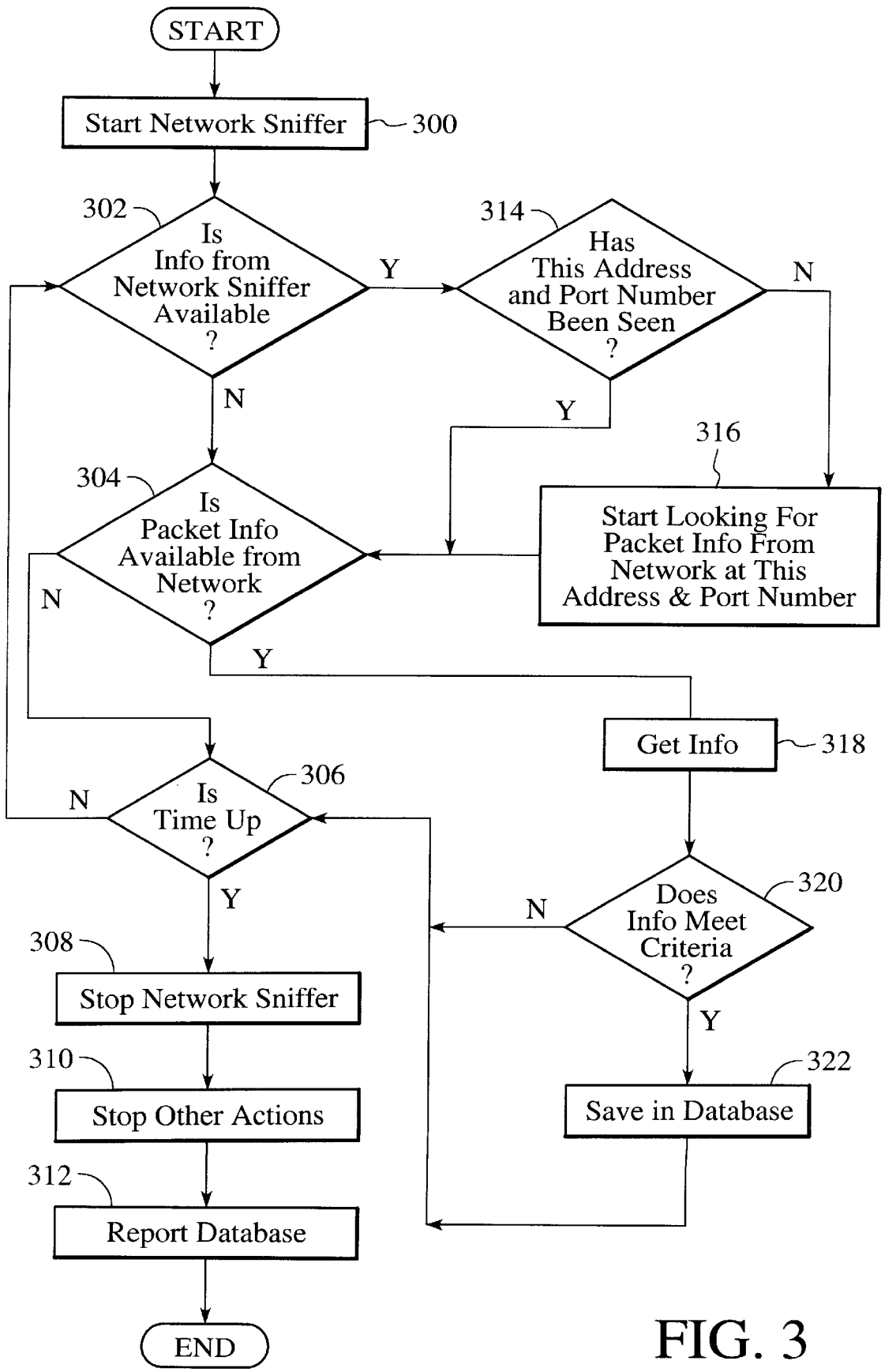
FIG. 3 is a flow diagram of a method according to the present invention.

FIG. 3 is a flow diagram of a method according to the present invention. The method shown in FIG. 3 is merely one example of obtaining the desired results according to the present invention. In this example, the network sniffer is started via step 300. It is then determined if the information from the network sniffer is available via step 302. The access element 210 of FIG. 2 would preferably perform this determination. As previously stated, available information means either public information or information which is within the particular user's privilege level. If the information from the network sniffer is not available, then it is determined, preferably by access element 210 of FIG. 2, if the packet information is available form the network via step 304. Note that the order of step 304 and 302 is completely interchangeable without affecting the results.

If the information form the data packet is not available, then it is determined if the predetermined time has elapsed via step 306. If the predetermined time has not elapsed, then another data packet is evaluated by the access element 210 from the network sniffer via step 302 and 304. If the predetermined time has elapsed, then the network sniffer is stopped via step 308 and any other actions which are in progress are also stopped via step 310. The other actions include actions via steps 314–322 which would also preferably be performed by access element 210 of FIG. 2. Information in the database is then reported to the access interface 212 of FIG. 2 via step 312.

If information from the network sniffer is available via step 302, then it is determined whether the address and port number of the data stream have previously been evaluated via step 314. If it has been previously evaluated, then it is determined if the packet information is available from the network via step 304. If it has not been previously evaluated, then the packet information from the network is looked for at the particular address and port number via step 316. Then it is determined if the packet information is available from the network via step 304. If the packet information is available from the network to the particular user via step 304, then the information is retrieved via step 318. It is then determined if the information meets the predetermined criteria via step 320. If it does not, then it is determined whether the predetermined time has elapsed via step 306. If, however, the information does meet the predetermined criteria, then it is saved in the data base via step 322. Again, it is determined if the predetermined time has elapsed via step 306. If so, then steps 308–312 are executed. If the predetermined time has not elapsed, then the next piece of information from the network sniffer is evaluated via step 302.

Although the system and method has been described in accordance with the embodiments shown, one of ordinary skill in the art will readily recognize that there could be variations to the embodiments and those variations would be within the spirit and scope of the above-described system and method. Accordingly, many modifications may be made by one of ordinary skill in the art without departing from the spirit and scope of the appended claims.

What is claimed is:

1. A method for locating available information in a network environment by a user at a node in the network, the method comprising the steps of:
   a) accessing the network sniffer that is monitoring data sent to the node;
   b) determining if the data being monitored by the network sniffer is privileged; and
   c) accessing data which is not privileged beyond the user's privileged level.

2. A method for locating at a node requested data from among data sent to the node in a network environment, the requested data being located for providing access thereto by a user at the node, the method comprising the steps of:
   a) accessing a network sniffer that is monitoring the data sent to the node;
   b) determining if the data being monitored by the network sniffer is privileged or public;
   c) determining if the data being monitored includes the available information if the data is privileged, wherein a privilege level of the available information is at or below a privilege level of the user;
   d) locating addresses and port numbers of the available information, wherein the available information from among the data being monitored includes the data which is public;
   e) reporting the available information including the corresponding addresses and port numbers; and
   f) providing access to the available information, wherein the available information includes the requested data and wherein the requested data is not privileged beyond the user's privilege level.

3. The method of claim 2, wherein the providing access step (f) further includes the step (f1) of transferring the requested data including the corresponding addresses and port numbers to the user at the node.

4. The method of claim 3 wherein the data determining step (b) further includes step (b2) of determining if a particular address and port number have already been processed.

5. The method of claim 3, wherein the data determining step (b) further includes step (b2) of evaluating a data packet associated with the address and port number.

6. The method of claim 2, wherein the reporting step (e) further includes the step (e1) of determining if the requested data which meets a predetermined criteria is included in the available information by determining if the data being monitored which comprises the available information meets the predetermined criteria.

7. The method of claim 6, wherein the reporting step (e) further includes the step (e2) of storing the requested data in a database if the data being monitored, which comprises the available information, meets the predetermined criteria.

8. The method of claim 6, wherein the predetermined criteria includes a data valid requirement.

9. The method of claim 6, wherein the requested data includes data which is audio data.

10. The method of claim 6, wherein the requested data includes data which is video data.

11. The method of claim 2, further comprising the step (g) of determining if time is up for stopping the accessing of the sniffer in step (a) after a predetermined time period and, if so, terminating all actions (steps a–f) including accessing the sniffer.

12. A system for locating available information in the network environment by a user in a node, the system comprising:
   means for monitoring data which is sent to the node; and
   means coupled to the monitoring means for accessing the data, wherein the accessing means determines if the data being monitored by the monitoring means is privileged beyond the user's privilege level, and wherein the accessing means reports the data which is not privileged beyond the user's privilege level and, with the data, the accessing means reports addresses and port numbers corresponding thereto.

13. The system of claim 12, further comprising a memory means coupled to the accessing means for storing the data being accessed if the accessed data meets a predetermined criteria.

14. The system of claim 12, further comprising an interface means for transferring the data which is not privileged beyond the user's privilege level.

15. A system for locating available information in the network environment by user data node, the system comprising:
   a first sniffer for monitoring data which is sent to a node; and
   a second sniffer coupled to the first sniffer for accessing the data which is being monitored by the first sniffer, wherein the second sniffer determines if the data being monitored is privileged beyond the user's privilege level, and wherein the accessing means reports the data which is not privileged beyond the user's privilege level and, with the data, the accessing means reports addresses and port numbers corresponding thereto.

16. The system of claim 15, wherein the second sniffer further comprises a memory for storing accessed data if the accessed data meets a predetermined criteria.

17. The system of claim 15, further comprising an interface for transferring the data which is not privileged beyond the user's privilege level.

18. A system for locating available information in a network environment by a user edit node, the system comprising:

accessing means for accessing data which is being monitored by a monitoring means, wherein the accessing means determines is the data being monitored is privileged beyond the user's privilege level, and wherein the accessing means reports the data which is not privileged beyond the user's privileged level and, with the data, the accessing means reports addresses and port numbers corresponding thereto; and interface means coupled to the accessing means for transferring accessed data which is not beyond the user's privilege level.

19. A computer readable medium containing program instructions for locating at a node requesting data from among data sent to the node in and network environment, the requested data being located for providing access thereto by a user at a node, the program instructions for:

a) accessing the networks never that is monitoring the data sent to the node;

b) determining if the data being monitored by the network sniffers is privileged or public;

c) determining if it data being monitored includes the available information if the data is privileged, wherein a privilege level of the available information is at or below a privilege level of the user;

d) locating addresses and port numbers of the available information wherein the available information from among the data being monitored includes the data which is public;

e) reporting the available information including the corresponding addresses and port numbers; and f) providing access to the available information, wherein the available information includes the requested data and wherein the requested data is not privileged beyond the user's privilege level.

* * * * *